United States Patent [19]
Ruelle et al.

[11] 3,821,574
[45] June 28, 1974

[54] TRANSPOSED WINDING BAR FOR A HIGH-POWER ELECTRICAL MACHINE

[75] Inventors: Gilbert Ruelle; Jacques Carlier; Henri Nithart, all of Belfort, France

[73] Assignee: Societe Generale de Constructions Electriques et Mecaniques (Alsthom), Paris, France

[22] Filed: July 21, 1972

[21] Appl. No.: 273,706

[30] Foreign Application Priority Data
July 22, 1971 France................ 71.26963

[52] U.S. Cl. .............................................. 310/213
[51] Int. Cl. ............................................... H02k 3/14
[58] Field of Search ............ 310/213, 193, 45, 198, 310/201, 179

[56] References Cited
UNITED STATES PATENTS

| 2,821,641 | 1/1958 | Ringland | 310/213 |
| 2,830,208 | 4/1958 | Staats | 310/213 |
| 3,118,015 | 1/1964 | Willyoung | 310/213 |
| 3,188,377 | 6/1965 | Hughes | 310/213 |
| 3,214,617 | 10/1965 | Judge | 310/213 |
| 3,585,428 | 6/1971 | Bennington | 310/213 |
| 3,602,751 | 8/1971 | Brenner | 310/213 |
| 3,614,497 | 10/1971 | Brenner | 310/213 |
| 3,647,932 | 3/1972 | Heller | 310/213 |

Primary Examiner—R. Skudy
Attorney, Agent, or Firm—Craig and Antonelli

[57] ABSTRACT

A winding bar for an electrical machine formed by a plurality of radially superimposed conductors each made up of a plurality of tangentially disposed strands, the conductors being periodically radially transposed in position and the strands being periodically tangentially transposed in position.

9 Claims, 7 Drawing Figures

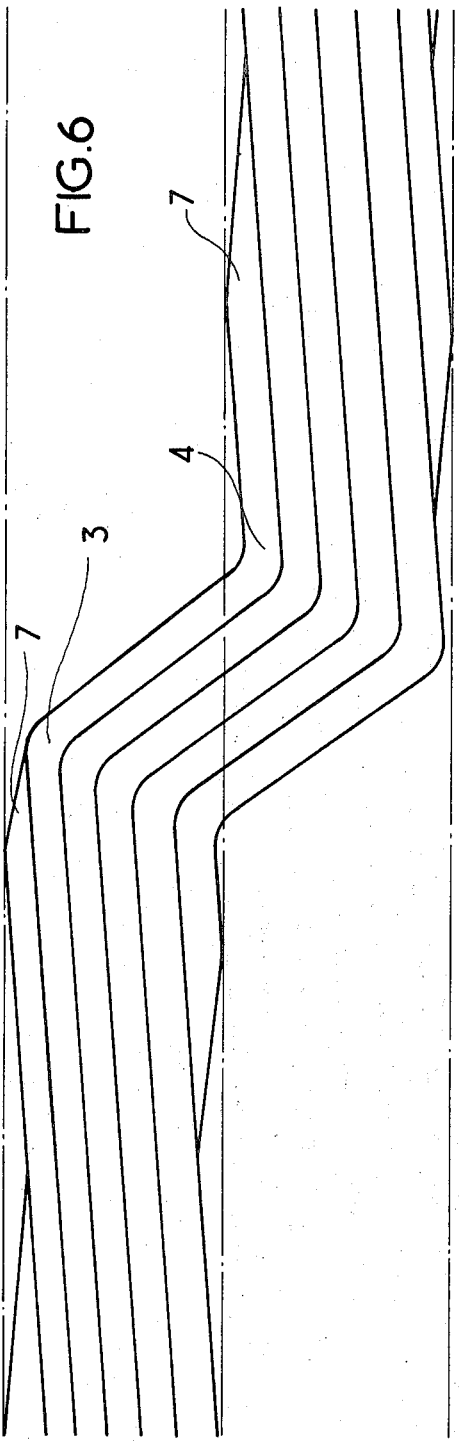
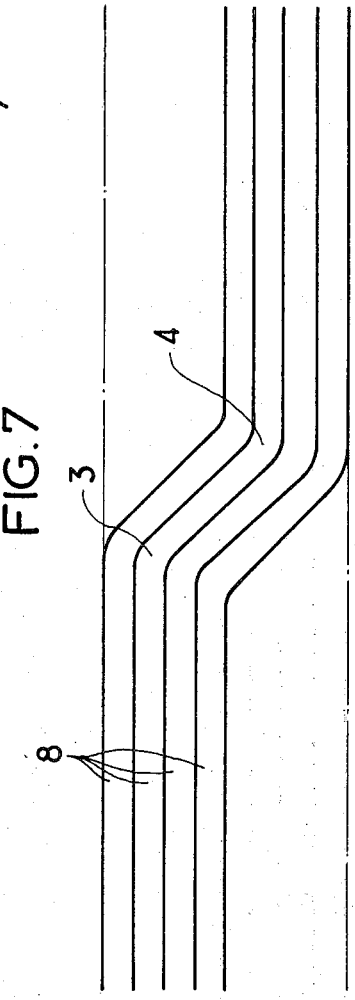

TRANSPOSED WINDING BAR FOR A HIGH-POWER ELECTRICAL MACHINE

An electrical conductor arranged in a variable magnetic field constitutes the seat of losses due to Foucault currents induced therein by the field perpendicular to the conductors. A winding element of an electrical machine, such as a bar or a section, comprised of elementary conductors, is also the seat of supplementary losses due to the difference in the electromotive forces induced along each of the elementary conductors.

It is known, for reducing the said supplementary losses to a negligible value, to divide the winding bars into elementary conductors having small dimensions in the plane parallel to the induction vector and to radially transpose the said conductors along the winding, either only in the core or also in the coil heads. Various conventional systems are known, under the names "Punga transposition" or "Roebel transposition" systems, and various improvements have been introduced into these systems, either in order to limit the transpositions to the straight portions of the bars, while at the same time taking into account the flux in the coil heads, or in order to manufacture bars comprising a number of radial planes of conductors larger than two, for example three or four, as in U.S. Pat. No. 3,188,377.

However, it has been perceived that these transposition systems, although they are satisfactory in the case of conventional machines wherein the bars are situated in notches and are subjected merely to a leakage flux perpendicular to the wall of the notch, do not adequately eliminate the supplementary losses in the windings arranged in the air gap or in the coreless electrical machines in which the space occupied by the windings is swept by a flux rotating with a high degree of intensity and a direction which constantly varies in time.

It has been found, according to the present invention, that it is possible, in these latter cases, to greatly reduce the supplementary losses in high power electrical machines by means of winding bars constituted by a plurality of groups of rectangular conductors disposed flat one upon the other in the radial direction and transposed in a known manner, the arrangement being characterized in that each conductor is constituted by at least one layer of a plurality of strands, covered with an electrical insulating means, grouped in a tangential plane and transposed in the tangential direction. These strands are preferably constituted by flat wires of rectangular section, the short sides having dimensions ranging between 0.05 mm and 1.5 mm and the large sides ranging between 0.3 mm and 5 mm.

The said strands are insulated either by means of a braiding or taping of natural or synthetic, organic or inorganic fibers, or by means of an organic enamel, or by means of a vitreous or ceramic coating of small thickness.

The tangential transposition of the strands of a layer may be obtained by turning or inverting the entire layer or by intersecting the strands, one by one.

It is also possible to build up the conductor from two layers of radially superposed strands, the tangential transposition of the strands of the said two layers being effected from one layer to another, in accordance with the Roebel process.

The winding bar may, furthermore, comprise cooling conduits which do not conduct current and which are only radially transposed.

With reference to the accompanying diagrammatic drawings, a description will be given hereinbelow, purely by way of nonlimiting example, of a mode of carrying the invention into effect.

FIG. 6 shows, as a plan view, a portion of a bar having radially transposed conductors, each constituted by two sheets of strands which are radially superposed and transposed in accordance with the Roebel process; and FIG. 7 shows, as a plan view, a portion of a layer of cooling conduits.

Figure 1:
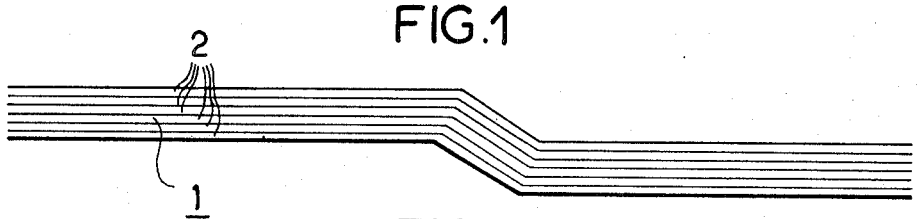
FIG. 1 shows, as a plan view, a conductor constituted by a layer or "sheet" of strands.
Figure 2:
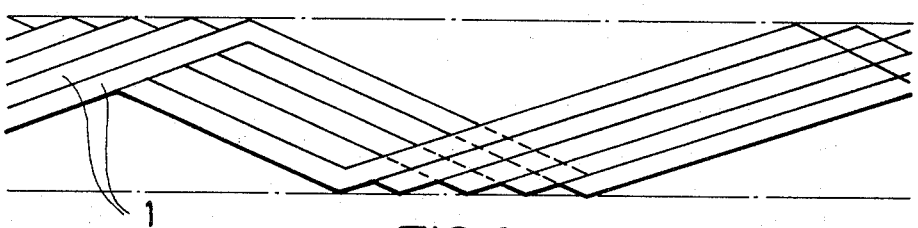
FIG. 2 shows, as a lateral view, a portion of a bar having radially transposed conductors.
Figure 3:
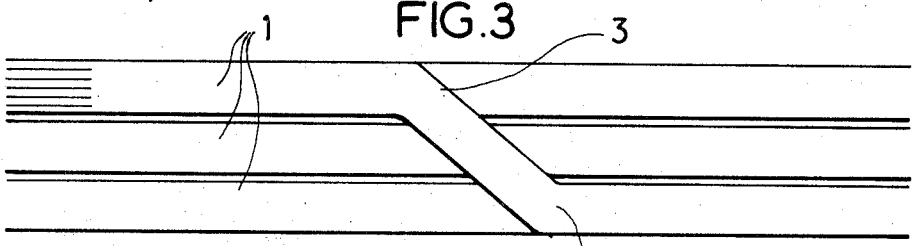
FIG. 3 shows, as a plan view, a portion of a bar having radially transposed conductors each constituted by a layer of strands.

Referring to FIG. 1, this figure shows a conductor 1 comprised of a layer or "sheet" of strands 2. In order to form a winding bar, conductors such as 1 are superposed in a plurality of groups and the conductors of the said groups are transposed radially in accordance with a known process, such as the Roebel process, as shown in FIGS. 2 and 3. The mode of radial transposition of the conductors may be any desired mode, the special feature of the invention being to use, whatever the mode of transposition, a layer or "sheet" of tangentially transposed strands instead of a single conductor. However, a radial transposition is additionally provided so that the electromotive force induced has the same amplitude in all of the strands, the induction vector exhibiting variable amplitude as a function of the radius under consideration and the transposition being uniform in order that each strand may have the same length at each level, radially measured.

The tangential transposition of the strands permits the electromotive forces induced in each strand to have the same phase, the phase shift of the voltage wave being equal to the angle of tangential offsetting of the radial plane in which the strand is located divided by the number of poles of the machine.

Figure 4:
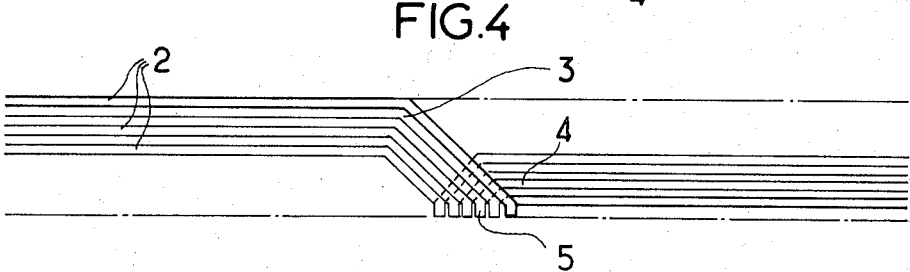
FIGS. 4 and 5 show, as a plan view, two examples of tangential transposition of the strands of a layer or "sheet"
Figure 5:
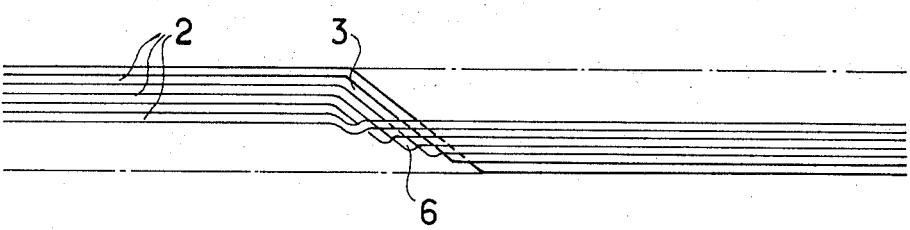

As shown in FIG. 3, in a transposition of the Roebel type, a conductor 1 extends from one radial group of conductors to the other through an inclined conductor portion having two bends 3 and 4. It is possible to carry into effect the tangential transposition of the strands 2 constituting a conductor 1 in the portions 3, 4 either by turning the entire layer of strands 2 and 5, as shown in FIG. 4, or by intersecting or bending the strands 2 one by one at 6, as shown in FIG. 5, this latter process affording diminished bulk and optionally making it possible, by double folding, to place in flat arrangement the portion of the conductor intersecting the others.

Thus, the strand 2 which occupied the position of order 1 in the conductor 1 before tangential transposition then occupies the position or order $n$, the conductor of initial order 2 then occupies order $n-1$, and so on, the conductor of order $n$ acquiring order 1.

The electromotive force induced in a strand angularly shifted by the value $\theta$ relative to the central strand will have, before tangential transposition (left-hand portion of FIG. 4 or 5), the form: $(U/2) \cos(\omega t + [\theta/p])$, $p$ being the number of pairs of poles of the machine. After this transposition (right-hand portion of FIGS. 4 or 5), it will have the form: $(U/2) \cos(\omega t - [\theta/p])$.

The total electromotive force induced in the strand under consideration will then have the form: $(U/2) \cos(\omega t + [\theta/p]) + \cos(\omega t - \theta/p) = U \cos(\omega t \cos[\theta/p])$ in phase for all the strands in parallel, the amplitude variation remaining negligible.

A further mode of effecting the tangential transposition of the strands constituting a conductor consists in utilizing as the conductor two layers or "sheets" of end strands, radially superposed, and effecting between the strands of these two sheets a Roebel type transposition, each of the two sheets being considered, for this particular transposition, as constituting a stack of conductors of a conventional Roebel bar. Each strand then occupies each tangential order or row on the same length and the electromotive force induced in the 2n strands of the two sheets constituting a conductor is the same in phase and in amplitude if the induction vector is in a transverse plane relative to the machine axis. This tangential transposition may be effected mechanically on the machine, starting from insulated wires, the pitch of this tangential transposition of the strands optionally being independent of the pitch of the radial transposition effected on the conductors each of which is comprised of 2n strands of two sheets.

The radial transposition of the conductors is effected in accordance with one of the known processes, the conductors optionally varying their radial plane by simple tangential offsetting or shifting, as shown in FIG. 6 with reference to a radial transposition of the Roebel type. In that figure, there are shown at 3 and 4 folds enabling the conductor to pass from one radial group of conductors to the other radial group of conductors and at 7 there is shown the passage of the strands of one sheet to the other of the two sheets constituting a conductor.

A winding bar comprised of conductors as described hereinabove may comprise furthermore cooling tubes of square or rectangular section, made of copper or preferably of a magnetic steel having a high degree of resistivity. In this latter case, the cooling tubes 8 are not current conductors and they are simply transposed in the radial plane, to permit the transposition of the conductors, passage from one radial plane to the other being effected by simple tangential offsetting by means of folds 3 and 4, shown in FIG. 7, without their being transposed in the tangential plane.

The bar thus constituted is agglomerated by any known means, for example by introducing, between the planes of the conductors and about the transpositions, thermosetting material, and then hot-pressing in order to make the bar compact and to cause the thermosetting agglomeration material to flow throughout the free volume. It is also possible to impregnate the assembly in vacuo by means of a thermosetting resin, or to bind the assembly of conductors in such manner as to constitute a cluster of rigid conductors capable of withstanding the electromagnetic forces.

The agglomerated bar is mass-insulated in accordance with a known process, for example by means of complexes comprising mica (mica paper), fiber support means and resin.

While there have been shown and described but specific embodiments of the invention, it will be understood by those skilled in the art that the invention is not limited thereto or thereby.

What is claimed is:

1. A winding bar for a high-power electrical machine, comprising a plurality of groups of rectangular conductors arranged flat, one upon the other, in the radial direction with respect to the axis of the machine and being periodically transposed radially in position with respect to each other, each conductor being formed from at least one layer of a plurality of strands covered with electrical insulating means, grouped in a tangential plane and being periodically transposed in the tangential direction.

2. A winding bar according to claim 1, characterized in that said strands are constituted by flat conductors of rectangular section, the short side of which has dimensions ranging between 0.05 mm and 1.5 mm and the large side has dimensions ranging between 0.3 mm and 5 mm.

3. A winding bar according to claim 1, characterized in that the tangential transposition of the strands of a layer is provided in the form of an inversion of the entire layer.

4. A winding bar according to claim 1, characterized in that the tangential transposition of the strands of a layer is provided in the form of a successive turning of the strands one by one from one direction to a second direction.

5. A winding bar according to claim 1, characterized in that each rectangular conductor is constituted by two radially superposed layers, and in that the tangential transposition of the strands of the said two layers from one layer to another is a Roebel transposition.

6. A winding bar according to claim 1, characterized in that it further comprises a plurality of cooling conduits which are nonconductive and which are transposed only radially.

7. A winding bar according to claim 1 wherein the pitch of the tangential transposition of the strands is independent of the pitch of the radial transposition of the conductors.

8. A winding bar according to claim 7, characterized in that each rectangular conductor is constituted by two radially superposed layers, and in that the tangential transposition of the strands of the said two layers from one layer to another is a Roebel transposition.

9. A winding bar according to claim 8, characterized in that it further comprises a plurality of cooling conduits which are nonconductive and which are transposed only radially.

* * * * *